UNITED STATES PATENT OFFICE.

PROSPER JEAN AUGUSTE MAIGNEN, OF PHILADELPHIA, PENNSYLVANIA.

TREATMENT OF MANURE.

1,218,678.

Specification of Letters Patent. Patented Mar. 13, 1917.

No Drawing. Application filed February 3, 1915. Serial No. 5,847.

*To all whom it may concern:*

Be it known that I, PROSPER JEAN AUGUSTE MAIGNEN, a citizen of France, residing at Philadelphia, in the county of Philadelphia and State of Pennsylvania, have invented a certain new and useful Improvement in the Treatment of Manure, whereof the following is a specification.

It is the object of my invention to preserve the fertilizing value of organic products, of vegetable or animal origin, including stable and barn-yard manure, green crops, sea weeds, meat, fish or other refuse liable to fermentation or putrefaction. Said substances are not directly available as fertilizers, but must undergo transformation by micro-organisms, before they can be utilized as plant food. Such transformation is manifested by fermentation or putrefaction of said substances during which part of the organic nitrogen is transformed into free ammonia which, when said substances are not in the soil, escapes into the atmosphere, and a part of said substances which is transformed into nitrates which, when not in the soil, may be lost by leaching and weathering; so that the loss of fertilizing values may amount to fifty or sixty per cent., if no preventive means are employed. The old process of making composts is intended to prevent such loss by causing the gases, and other fertilizing products set free by fermentation, to be absorbed by peat, earth, or other inert absorbing material.

I have discovered that the fertilizing values of such organic products may be preserved without the employment of inert absorbing material, by causing the activity of the micro-organisms to be suspended until such time as it is desired to employ said substances as fertilizers. Such temporary sterilization of said organic matter is conveniently effected by subjecting the same to one or more macerations in an aqueous alkaline solution. Such solutions are preferably formed of sodalime, or about equal parts of lime and soda, of strength which may be varied to suit the particular kind of substance to be treated, so that the activity of the micro-organisms is thereby checked and suspended and the original soluble organic and inorganic substances are chemically transformed into new combinations. For instance, a solution containing about one per cent. of said compounds of calcium and sodium may be employed. The product of the treatment aforesaid may then be concentrated or evaporated to such a degree as to deprive the micro-organisms of the moisture which is necessary to their activity, and the treated material can be stored, transported or otherwise manipulated without putrefaction until it is placed on the soil or diluted with water.

In treating such raw materials as above specified in accordance with my invention, I place such materials, as fresh as possible, in a vessel to which I add the alkaline solution. Some substances may be sufficiently macerated cold, but others are preferably warmed, and the degree of heat is to be regulated in accordance with the particular kind of material under treatment. When heat is used, I find it preferable to apply the same for a given time and then withdraw it; so that while the temperature is raised, air is driven off from the material under treatment and during the subsequent cooling, the solvent is absorbed into the pores of the material. In some cases, a single maceration is sufficient, but some substances may advantageously be subjected to several macerations, either with the same solution or with fresh solutions, of such strength as the nature of the material requires.

When the process of temporary sterilization, above described, is completed; the product may be further treated either by drying the solute and the solid together, or by separating the solute from the solid, either by draining or otherwise, and evaporating or drying them separately; the fluid solute being preferably concentrated to the consistency of a paste or solid. Such concentration is of commercial advantage in that the fertilizing material is thus reduced to minimum bulk and weight so that storage or transportation thereof may be effected more economically than in the original natural condition.

It may be observed that untreated manures are capable of conveying infectious diseases to man, beast or plant; may carry seeds of weeds, or injurious biological or chemical products; may become "hot," "fire-fanged," or otherwise deteriorate, and are not applicable to all crops. Treatment in accordance with my invention eliminates all of said objectionable features and affords a product which, in part, acts directly as a fertilizer, because it is soluble in water; and the remainder sustains the action of the nitrifying bacteria when in the ground or mixed with water.

The temporary sterilization or suspension of activity of the micro-organisms, resulting from treatment in accordance with my invention as above set forth, does not persist unless the product is kept in the concentrated form, as the addition of sufficient moisture permits micro-organisms to act upon such product.

I claim:—

1. A process of preserving the fertilizing value of manure by temporary sterilization, effected by subjecting the raw material to the action of an aqueous solution including compounds of calcium and sodium until organic constituents of the manure combine with the solvent, and then evaporating the product to such a degree as to suspend fermentation or putrefaction thereof.

2. A product including organic and inorganic soluble compounds of natural manure, modified by maceration with an aqueous solution including compounds of calcium and sodium, and evaporation to such a degree as to suspend putrefaction.

3. A product including organic and inorganic soluble compounds of natural manure, modified by maceration with an aqueous solution including sodalime, and evaporation to such a degree as to suspend putrefaction.

4. A process of treating material including elements of fertilizing value, which consists in subjecting the whole material to the action of an aqueous solution including compounds of calcium and sodium until said elements of fertilizing value combine with the solvent, and then separating said solvent with its contained fertilizing elements, from the other portions of said material, and evaporating said product to such a degree as to temporarily sterilize it and suspend putrefaction thereof.

5. The process of treating a material including elements devoid of fertilizing value and elements having fertilizing value, which consists in subjecting the whole material to the action of an aqueous solution including compounds of calcium and sodium until the fertilizing elements of said material combine with the solvent, and then separating said solvent, with its fertilizing contents, from the other elements of said material, and evaporating the product to such a degree as to temporarily sterilize it and suspend putrefaction thereof; whereby the elements of said material having fertilizing value are not only separated from the elements devoid of fertilizing value but are preserved.

In testimony whereof, I have hereunto signed my name at Philadelphia, Pennsylvania, this first day of February, 1915.

PROSPER JEAN AUGUSTE MAIGNEN.

Witnesses:
MARY McCALLA,
WM. J. QUAIN.